(12) United States Patent
Feng (10) Patent No.: US 11,604,919 B2
(45) Date of Patent: Mar. 14, 2023

(54) METHOD AND APPARATUS FOR RENDERING LYRICS

(71) Applicant: TENCENT MUSIC ENTERTAINMENT TECHNOLOGY (SHENZHEN) CO., LTD., Guangdong (CN)

(72) Inventor: Suiyu Feng, Guangdong (CN)

(73) Assignee: TENCENT MUSIC ENTERTAINMENT TECHNOLOGY [SHENZHEN] CO., LTD., Guangdong (CN)

( * ) Notice: Subject to any disclaimer, the term of this patent is extended or adjusted under 35 U.S.C. 154(b) by 0 days.

(21) Appl. No.: 17/056,172

(22) PCT Filed: Nov. 21, 2018

(86) PCT No.: PCT/CN2018/116599
§ 371 (c)(1),
(2) Date: Nov. 17, 2020

(87) PCT Pub. No.: WO2019/223269
PCT Pub. Date: Nov. 28, 2019

(65) Prior Publication Data
US 2021/0216702 A1   Jul. 15, 2021

(30) Foreign Application Priority Data

May 25, 2018   (CN) .......................... 201810545626.9

(51) Int. Cl.
*G06F 40/169*  (2020.01)
*G06F 40/279*  (2020.01)

(52) U.S. Cl.
CPC .......... *G06F 40/169* (2020.01); *G06F 40/279* (2020.01)

(58) Field of Classification Search
CPC ............................. G06F 40/169; G06F 40/279
See application file for complete search history.

(56) References Cited

U.S. PATENT DOCUMENTS

| 2006/0150802 | A1* | 7/2006 | Whiting ................. G10H 1/386 84/603 |
| 2011/0276333 | A1 | 11/2011 | Wang et al. |
| 2017/0018203 | A1* | 1/2017 | Fisher .................... G09B 19/04 |

FOREIGN PATENT DOCUMENTS

| CN | 103793364 A | 5/2014 |
| CN | 104093085 A | 10/2014 |

(Continued)

OTHER PUBLICATIONS

"International search report of PCT application No. PCT/CN2018/116599", dated Feb. 25, 2019, Published in: CN, p. 18.

(Continued)

*Primary Examiner* — Kyle R Stork
(74) *Attorney, Agent, or Firm* — Neugeboren O'Dowd PC (57) ABSTRACT

A method for rendering lyrics is provided, including: acquiring pronunciation of a polyphonic word to be rendered in target lyrics, and acquiring playback time information of the pronunciation in the process of rendering the target lyrics; determining a first number of furiganas contained in the pronunciation; and word-by-word simultaneously rendering, according to the first number and the playback time information of the pronunciation of the polyphonic word to be rendered, the polyphonic word to be rendered and each furigana in the pronunciation of the polyphonic word to be rendered, wherein the pronunciation of the polyphonic word to be rendered is adjacent to and parallel to the polyphonic word to be rendered.

13 Claims, 5 Drawing Sheets

(56) References Cited

FOREIGN PATENT DOCUMENTS

| | | |
|---|---|---|
| CN | 105761733 A | 7/2016 |
| CN | 106653071 A | 5/2017 |
| CN | 107864410 A | 3/2018 |
| CN | 107943964 A | 4/2018 |
| CN | 108763182 A | 11/2018 |
| JP | 2000029475 A | 1/2000 |
| JP | 2014026232 A | 2/2014 |

OTHER PUBLICATIONS

"First office action of Chinese application No. 201810545626.9", dated Feb. 3, 2020, Published in: CN, p. 15.
"Second office action of Chinese application No. 201810545626.9", dated Jul. 17, 2020, Published in:CN, p. 15.
Guoguo Guo's music stories, "QQ Music is a powerful feature that can teach you how to sing Japanese songs", May 22, 2018, pp. 1-7.
Extended European search report of European application No. 18919467.3 dated Mar. 2, 2022.
Karaoke Singing King: "[Karaoke] Lemon/ Kenshi Yonezu", Mar. 1, 2018, Screen captures of the video between 24 and 27 seconds, pp. 1-4, URL: https: //www.youtube.com/watch?v=-n9cF1Xly80.
Gijs Geleijnse et al., Enriching Music with Synchronized Lyrics, Images and Colored Lights, Ambi-Sys, Quebec, Canada, Jan. 1, 2008, abstract, sections 2 to 3.3, pp. 2-4.

\* cited by examiner

Additional part

[al: the album of the song]
[ar: performer-singer]
[au: lyrics writer-composer]
[by: creator of the LRC file]
...

METHOD AND APPARATUS FOR RENDERING LYRICS

This application is a national phase application based on PCT/CN2018/116599, filed on Nov. 21, 2018, which claims priority to Chinese Patent Application No. 201810545626.9, filed on May 25, 2018 and entitled "METHOD AND APPARATUS FOR RENDERING LYRICS", the entire contents of which are incorporated herein by reference.

TECHNICAL FIELD

The present disclosure relates to the field of computer technologies, and in particular, relates to a method and apparatus for rendering lyrics.

BACKGROUND

With the development of computer technologies, audio application programs have been gradually globalized and are capable of playing Chinese songs. English songs, and Japanese songs, and the like. When the songs are played, in order to make the songs sound more artistic, the condition that the pronunciation of some polyphonic words is different from the most commonly used pronunciation often occurs. For example, in Japanese songs, the common pronunciation of the word "宿命" is "しゅくめい," and its pronunciation in the song is "さだめ." Therefore, in order to display the correct pronunciation of the polyphonic word in the lyrics, generally, the polyphonic word with a special pronunciation is marked with the correct pronunciation.

SUMMARY

Embodiments of the present disclosure provide a method and apparatus for rendering lyrics. The technical solutions are as follows:

In a rust aspect, a method for rendering lyrics is provided. The method includes:

acquiring pronunciation of a polyphonic word to be rendered in target lyrics, and acquiring playback time information of the pronunciation in the process of rendering the target lyrics;

determining a rust number of furiganas contained in the pronunciation; and word-by-word rendering, according to the first number and the playback time information of the pronunciation of the polyphonic word to be rendered, the polyphonic word and each furigana in the pronunciation of the polyphonic word to be rendered simultaneously, wherein the pronunciation of the polyphonic word to be rendered is adjacent to and parallel to the polyphonic word to be rendered.

Optionally, the target lyrics are Japanese lyrics; and
the method further includes:
determining that a contracted sound exists in the furigana of the pronunciation of the polyphonic word to be rendered.

Optionally, word-by-word rendering, according to the first number and the playback time information of the pronunciation of the polyphonic word to be rendered, the polyphonic word and each furigana in the pronunciation of the polyphonic word to be rendered simultaneously includes:

determining, according to the playback time information of the pronunciation of the polyphonic word to be rendered, a rendering duration of each furigana in the pronunciation of the polyphonic word to be rendered;

segmenting pixels of the polyphonic word to be rendered into a first number of sub-pixels equally in a rendering direction;

causing, according to the rendering direction, the sub-pixels obtained by segmentation to be in one-to-one correspondence with the furiganas in the pronunciation of the polyphonic word to be rendered; and word-by-word rendering, for each furigana in the pronunciation of the polyphonic word to be rendered, the furigana and the sub-pixels obtained by segmentation and corresponding to the furigana simultaneously within the rendering duration of the furigana.

Optionally, word-by-word rendering, according to the first number and the playback time information of the pronunciation of the polyphonic word to be rendered, the polyphonic word and each furigana in the pronunciation of the polyphonic word to be rendered simultaneously includes:

obtaining a second number by subtracting the number of contracted sounds from the first number; and word-by-word rendering, according to the second number and the playback time information of the pronunciation of the polyphonic word to be rendered, the polyphonic word to be rendered and each furigana in the pronunciation of the polyphonic word to be rendered simultaneously.

Optionally, word-by-word rendering, according to the first number and the playback time information of the pronunciation of the polyphonic word to be rendered, the polyphonic word and each furigana in the pronunciation of the polyphonic word to be rendered simultaneously includes:

determining, according to the playback time information of the pronunciation of the polyphonic word to be rendered, a rendering duration of each syllable in the pronunciation of the polyphonic word;

segmenting pixels of the polyphonic word to be rendered into a second number of sub-pixels equally in a rendering direction;

causing, according to the rendering direction, the sub-pixels obtained by segmentation to be in one-to-one correspondence with the syllables in the pronunciation of the polyphonic word to be rendered; and word-by-word rendering, for each syllable in the pronunciation of the polyphonic word to be rendered, the syllable and the sub-pixels obtained by segmentation and corresponding to the syllable simultaneously within the rendering duration of the syllable.

Optionally, acquiring the pronunciation of the polyphonic word to be rendered in the target lyrics and acquiring the playback time information of the pronunciation includes:

acquiring the pronunciation of the polyphonic word to be rendered in the target lyrics from an additional part of a text of the target lyrics, and acquiring a rendering start identifier of each furigana in the pronunciation; and determining the rendering start identifier of each furigana in the pronunciation as the playback time information of the pronunciation.

In a second aspect, an apparatus for rendering lyrics is provided. The apparatus includes: a processor and a memory configured to store at least one instruction executable by the processor; wherein the at least one instruction, when executed by the processor, causes the processor to perform a method for rendering lyrics comprising:

acquiring pronunciation of a polyphonic word to be rendered in target lyrics, and acquire playback time information of the pronunciation in the process of rendering the target lyrics;

determining a first number of furiganas contained in the pronunciation; and word-by-word rendering, according to the first number and the playback time information of the pronunciation of the polyphonic word to be rendered, the polyphonic word to be rendered and each furigana in the pronunciation of the polyphonic word to be rendered simultaneously, wherein the pronunciation of the polyphonic word to be rendered is adjacent to and parallel to the polyphonic word to be rendered.

Optionally, the target lyrics are Japanese lyrics; and the method further comprises:

determining that a contracted sound exists in the furigana of the pronunciation of the polyphonic word to be rendered.

Optionally, word-by-word rendering, according to the first number and the playback time information of the pronunciation of the polyphonic word to be rendered, the polyphonic word and each furigana in the pronunciation of the polyphonic word to be rendered simultaneously comprises:

determining, according to the playback time information of the pronunciation of the polyphonic word to be rendered, a rendering duration of each furigana in the pronunciation of the polyphonic word to be rendered;

segmenting pixels of the polyphonic word to be rendered into a first number of sub-pixels equally in a rendering direction;

causing, according to the rendering direction, the sub-pixels obtained by segmentation, to be in one-to-one correspondence with the furiganas in the pronunciation of the polyphonic word to be rendered; and word-by-word rendering, for each furigana in the pronunciation of the polyphonic word to be rendered, the furigana and the sub-pixels obtained by segmentation and corresponding to the furigana simultaneously within the rendering duration of the furigana.

Optionally, word-by-word rendering, according to the first number and the playback time information of the pronunciation of the polyphonic word to be rendered, the polyphonic word and each furigana in the pronunciation of the polyphonic word to be rendered simultaneously comprises:

obtaining a second number by subtracting the number of contracted sounds from the first number; and word-by-word rendering, according to the second number and the playback time information of the pronunciation of the polyphonic word to be rendered, the polyphonic word to be rendered and each furigana in the pronunciation of the polyphonic word to be rendered simultaneously.

Optionally, word-by-word rendering, according to the first number and the playback time information of the pronunciation of the polyphonic word to be rendered, the polyphonic word and each furigana in the pronunciation of the polyphonic word to be rendered simultaneously comprises:

determining, according to the playback time information of the pronunciation of the polyphonic word to be rendered, a rendering duration of each syllable in the pronunciation of the polyphonic word;

segmenting pixels of the polyphonic word to be rendered into the second number of sub-pixels equally in a rendering direction;

causing, according to the rendering direction, the sub-pixels obtained by segmentation to be in one-to-one correspondence with the syllables in the pronunciation of the polyphonic word to be rendered; and word-by-word rendering, for each syllable in the pronunciation of the polyphonic word to be rendered, the syllable and the sub-pixels obtained by segmentation and corresponding to the syllable simultaneously within the rendering duration of the syllable.

Optionally, acquiring the pronunciation of the polyphonic word to be rendered in the target lyrics and acquiring the playback time information of the pronunciation comprises:

acquiring the pronunciation of the polyphonic word to be rendered in the target lyrics from an additional part of a text of the target lyrics, and acquiring a rendering start identifier of each furigana in the pronunciation; and determining the rendering start identifier of each furigana in the pronunciation as the playback time information of the pronunciation.

In a third aspect, a non-transitory computer-readable storage medium for storing a computer program is provided. The computer program is loaded by a processor to execute the method for rendering lyrics as defined in the first aspect.

In a fourth aspect, a terminal is provided. The terminal includes: a processor and a memory configured to store at least one instruction executable by the processor; wherein the at least one instruction, when executed by the processor, causes the processor to perform the method for rendering lyrics as defined in the first aspect.

BRIEF DESCRIPTION OF THE DRAWINGS

In order to describe the technical solutions in the embodiments of the present more clearly, the following briefly introduces the accompanying drawings required for describing the embodiments. Apparently, the accompanying drawings in the following description show merely some embodiments of the present disclosure, and a person of ordinary skill in the art may also derive other drawings from these accompanying drawings without creative efforts.

DETAILED DESCRIPTION

For clearer descriptions of the objects, technical solutions and advantages in the present disclosure, the present disclosure is described in detail below in combination with the accompanying drawings.

When the pronunciation is marked, a bracket is generally added behind the polyphonic word, and the correct pronunciation is displayed in the bracket.

In this way, if the lyrics are displayed in a word-by-word rendering manner during song playing, the pronunciation is added behind the polyphonic word, and the total playback duration of the polyphonic word is divided by the number of Chinese characters of the polyphonic word to get the rendering duration of each Chinese character. Hence, only the rendering of the polyphonic word is considered, and the rendering of the pronunciation is not considered. After the polyphonic word is played, the rendering may start from the pronunciation of the polyphonic word. As a result, the lyrics do not match the currently played content. Accordingly, it is urgent to provide a method for rendering the lyrics.

An embodiment of the present disclosure provides a method for rendering lyrics, and an execution main body of the method may be a terminal. The terminal may be a tablet computer, a mobile phone, or a computer, and an audio application program (for example, a Karaoke application program) may be set in the terminal for playing audio data.

The terminal may be provided with a processor, a memory, a transceiver, and the like therein. The processor may be configured to perform the process of rendering the lyrics. The memory may be configured to render the data required in the lyrics and the generated data, and the transceiver may be configured to receive and send the data. The terminal may also be provided with an input and output device, for example a screen, therein. The screen may be a touch screen, and the screen may be configured to display the lyrics and the like. This embodiment uses the mobile phone as an example of the terminal to describe the solution in detail. Other similar situations are not repeated in this embodiment.

Before practice, the application scenario of the embodiment of the present disclosure is introduced at first.

Figure 1:
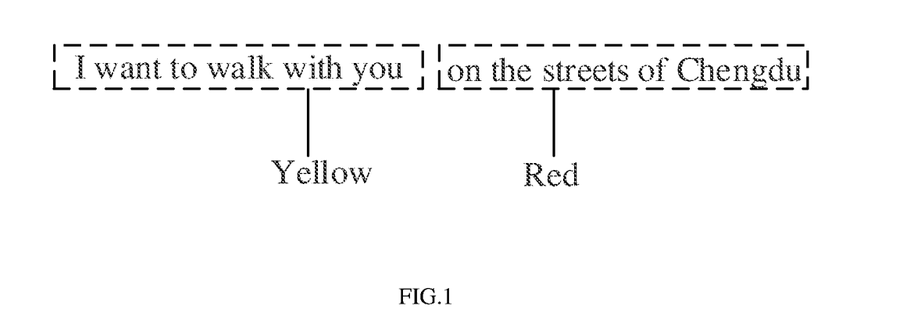
FIG. 1 is a schematic diagram of lyrics according to an embodiment of the present disclosure.

When a user plays a song by using the terminal, in order to remind the user of the lyrics corresponding to the currently played audio, the lyrics are generally rendered on the screen. The process is: when the audio is played to the corresponding lyrics, the color of the lyrics will change to other colors, such that the user can know the lyrics corresponding to the current audio. For example, as shown in FIG. 1, the song is "Chengdu" and the lyrics are "I want to walk with you on the streets of Chengdu . . . ." The original color of the lyrics is red, and if the lyrics corresponding to the current played audio are "with you," the color of "with you" will turn yellow, then the purpose of reminding can be achieved. For some songs, certain words in the lyrics of the song are polyphonic words (referring to the words with multiple pronunciations, for example, the pronunciation of "さだめ" (meaning "appear" in Chinese) in Japanese is "だ" or "で"). When the lyrics are displayed, the pronunciation will be marked. For example, for some Japanese songs, in order to achieve the artistic effect, the pronunciation of certain words in the lyrics is different from the most commonly used pronunciation (the commonly used pronunciation of the word "宿命" is "しゅくめい," but in the lyrics, the pronunciation is "さだめ"), then the pronunciation may be annotated, and thus it is necessary to render the lyrics together with the pronunciation. The embodiment of the present disclosure provides the following solution on such a basis.

In addition, the storage manner of the target lyrics text in the embodiment of the present disclosure will be described:

[first line play start identifier] [play start identifier] first word of the first line <play start identifier> the second word of the first line of first line <play start identifier> . . . the last word of the first line.

Figure 2:
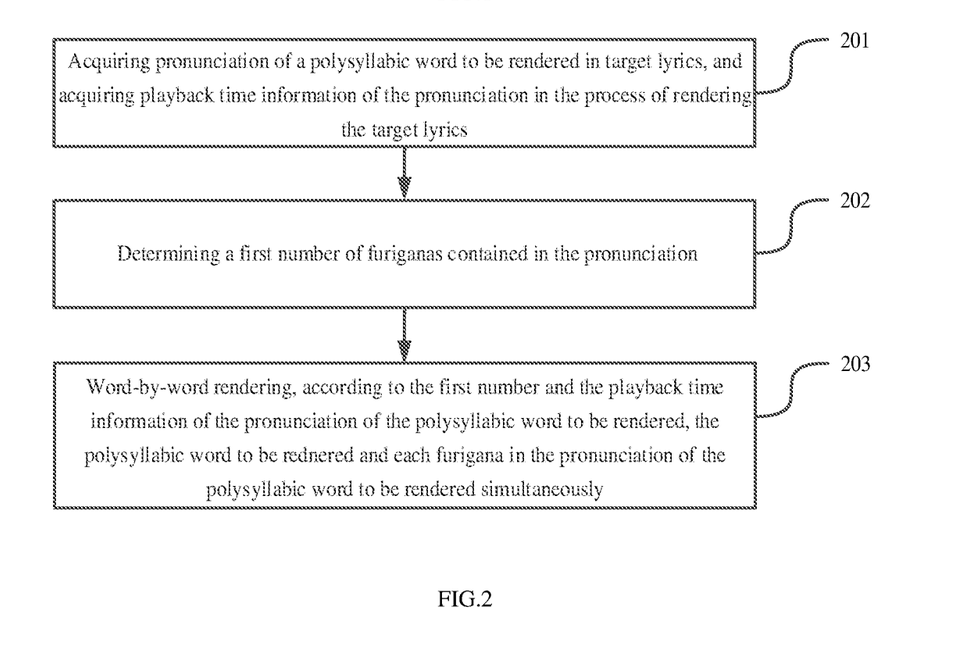
FIG. 2 is a flowchart of a method for rendering lyrics according to an embodiment of the present disclosure.

In the embodiment of the present disclosure, the solution is described by using a Japanese song as an example. As shown in FIG. 2, the method may include the following steps:

In step 201, in the process of rendering the target lyrics, pronunciation of the polyphonic word to be rendered in the target lyrics is acquired, and playback time information of the pronunciation is acquired.

The target lyrics are the lyrics of any song, and the target lyrics include at least one polyphonic word, for example, the target song may be a popular song. The polyphonic word refers to the word having multiple pronunciations. For example, the pronunciation of "出" in Japanese is "だ" or "で."

In the practice, to listen to a song, the user may install an audio application program in the terminal and perform login processing, the terminal will display the main interface of the audio application program, and the user can select a favorite song (referred to as the target song hereinafter) to play. When detecting the playing of the target song, the terminal can display a lyrics interface. Generally, a line of lyrics is displayed, the pronunciation of the polyphonic word in the line of lyrics is displayed, and the line of lyrics is rendered.

During the playing of the target song, the target lyrics corresponding to the target song are rendered. When the audio of the polyphonic word (referred to as the polyphonic word to be rendered hereinafter) is played, the terminal may acquire the pronunciation of the polyphonic word to be rendered, and acquire the playback time information of the pronunciation. The playback time information is configured to indicate the rendering time of the pronunciation.

Optionally, when the lyrics to be rendered are played, a pre-stored dictionary may be searched to find the pronunciation of the polyphonic word to be rendered.

Optionally, when the lyrics to be rendered are played, the pronunciation of the polyphonic word to be rendered may be acquired from the pre-stored pronunciation (the storage method is described in detail hereinafter).

Optionally, the related content of the polyphonic word to be rendered in the target lyrics may be acquired from the additional part of the target lyrics text, and step 201 may be as follows:

From the additional part of the target lyrics text, the pronunciation of the polyphonic word to be rendered in the target lyrics is acquired, the rendering start identifier of each furigana in the pronunciation is acquired, and the rendering start identifier of each furigana in the pronunciation is determined as the playback time information of the pronunciation.

The rendering start identifier is configured to search for the corresponding polyphonic word, and may be a timestamp. When the lyrics are stored, the format is generally [rendering start identifier] the first word of the first line [rendering start identifier] the second word of the first line . . . , such that the pronunciation of the polyphonic word can be determined according to the same rendering start identifier.

Figure 3:
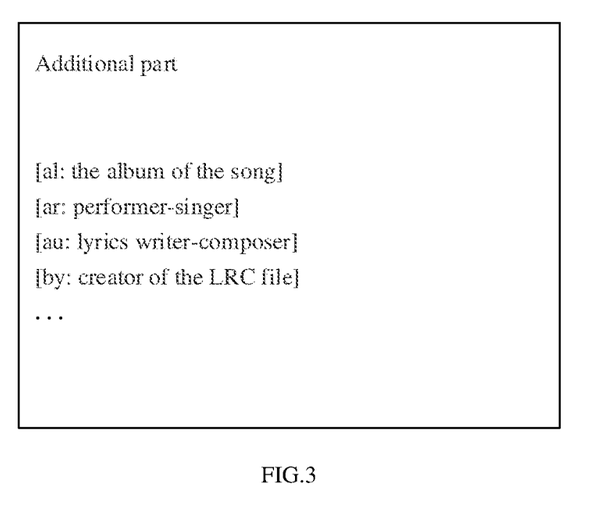
FIG. 3 is a schematic diagram of an additional part of a lyrics text according to an embodiment of the present disclosure.

In the practice, the additional part of the target lyrics text may be a lyrics Meta paragraph, which refers to a part irrelevant with the rendered content of the lyrics and configured to record the additional information of the lyrics. For example, as shown in FIG. 3, in the lyrics of the LRC (lyric) format, in front of the lyrics text, there is the following content al: the album of the song, ar: performer-singer, au: lyrics writer-composer, by: creator of the LRC file, or the like. The pronunciation of the polyphonic word of the target lyrics and the rendering start identifier may be added to the additional part of the target lyrics text, and may be stored in the format of "kana: [rendering start identifier] furigana [rendering start identifier] furigana . . . ."

The terminal may acquire the pronunciation of the polyphonic word to be rendered of the target lyrics and the rendering start identifier of each furigana, and then determine the rendering start identifier of each furigana in the pronunciation as the playback time information of the pronunciation.

In step 202, a first number of furiganas contained in the pronunciation is determined.

The furigana is a kana configured to mark the words in Japanese. For example, the pronunciation of "欠片" (meaning "fragment" in Chinese) in Japanese is "かけら."

In the practice, after acquiring the polyphonic word to be rendered, the terminal may determine the first number of the furiganas contained in the pronunciation of the polyphonic word to be rendered. For example, in Japanese, the polyphonic word to be rendered is "雨" (meaning "rain" in Chinese), the pronunciation is "あめ," and the first number of the furiganas is 2.

In step 203, the polyphonic word to be rendered and each furigana in the pronunciation of the polyphonic word to be rendered are word-by-word rendered simultaneously according to the first number and the playback time information of the pronunciation of the polyphonic word to be rendered.

Figure 4:
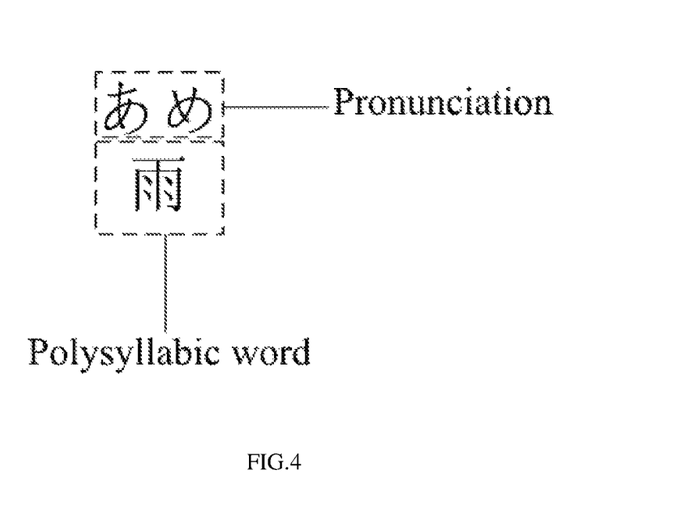
FIG. 4 is a display schematic diagram of a pronunciation according to an embodiment of the present disclosure.

In the implementation, when the target lyrics are displayed, there is a certain gap between the two lines of lyrics. If the target lyrics contain the polyphonic word to be rendered, the pronunciation of the polyphonic word may be displayed above or below the polyphonic word to be rendered, that is, the pronunciation of the polyphonic word to be rendered is adjacent to and parallel to the polyphonic word to be rendered. For example, as shown in FIG. 4, the pronunciation "あめ" is displayed above "雨" (meaning "rain" in Chinese).

After determining the first number of the furiganas contained in the pronunciation of the polyphonic word to be rendered, the terminal may simultaneously dye each furigana in the pronunciation of the polyphonic word to be rendered and the polyphonic word to be rendered according to the first number and the playback time information of the pronunciation of the polyphonic word to be rendered, to achieve the rendering effect, thereby achieving the synchronous rendering of the pronunciation and the polyphonic words to be rendered.

Optionally, the polyphonic word to be rendered may be rendered according to the rendering duration of each furigana, and the corresponding processing may be as follows:

The rendering duration of each furigana in the pronunciation of the polyphonic word to be rendered is determined according to the playback time information of the pronunciation of the polyphonic word to be rendered. The pixels of the polyphonic word to be rendered is segmented into the first number of sub-pixels equally in a rendering direction. According to the rendering direction, the sub-pixels obtained by segmentation are caused to be in one-to-one correspondence with the furiganas in the pronunciation of the polyphonic word to be rendered. For each furigana in the pronunciation of the polyphonic word to be rendered, the furigana and the sub-pixels obtained by segmentation and corresponding to the furigana are word-by-word rendered simultaneously within the rendering duration of the furigana.

The rendering direction is configured to indicate the sequence in which the words in a line of lyrics are displayed, for example, the lyrics are rendered in the transverse direction from left to right.

In the practice, if the playback time information of the pronunciation of the polyphonic word to be rendered is the rendering start time of each furigana (also referred to as a timestamp), the display start time of two consecutive furiganas may be subjected to subtraction to get the rendering duration other than the last furigana. The rendering duration of the last furigana is the rendering start time of the word to be sang adjacent to the polyphonic word to be rendered minus the rendering start time of the furigana. For example, the polyphonic word to be rendered is "雨" (meaning "rain" in Chinese), the pronunciation is "あめ," the rendering start time of the furigana "あ" is 0, the rendering start duration of the furigana "め" is 200 ms, the rendering start time of the word behind the polyphonic word to be rendered is 300 ms, the rendering duration of the furigana "あ" is 200 ms, and the rendering duration of the furigana "め" is 100 ms.

If the playback time information of the pronunciation of the polyphonic word to be rendered is expressed in an implicit manner (the rendering start time of the first furigana of the pronunciation is not displayed in the implicit manner, described in detail later), the rendering duration of each furigana in the pronunciation of the polyphonic word to be rendered can be determined based on the rendering start time of the word corresponding to the polyphonic word to be rendered in the lyrics.

Figure 5:
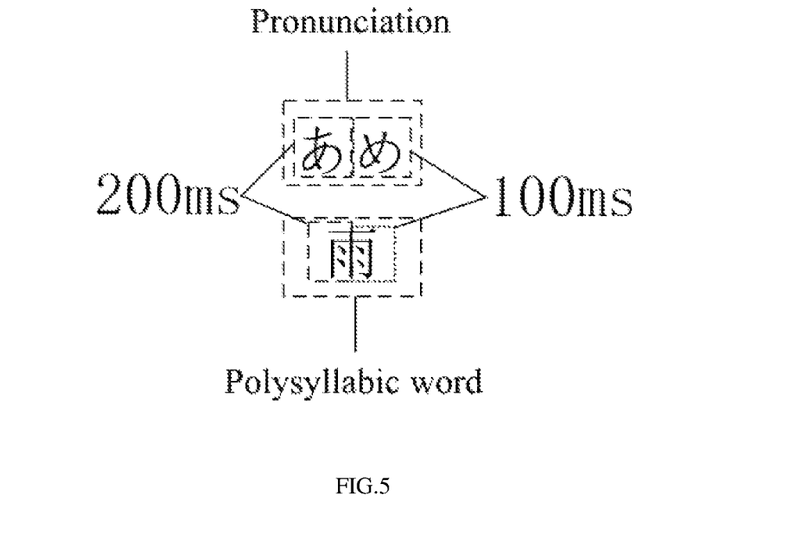
FIG. 5 is a schematic diagram of rendering according to an embodiment of the present disclosure.
Figure 6:
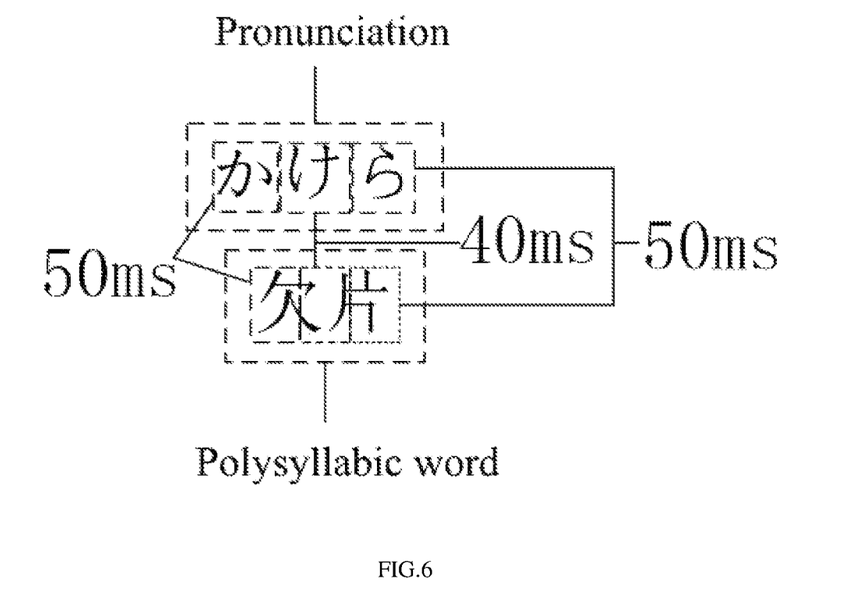
FIG. 6 is a schematic diagram of rendering according to an embodiment of the present disclosure.

After determining the rendering duration of each furigana, the pixels of the word to be rendered may be segmented into the first number of sub-pixels equally in the rendering direction, and then the equally segmented sub-pixels are caused to be in one-to-one correspondence with the furiganas. As shown in FIG. 5, the above "雨" in Japanese is still taken as the example, the first number of the furiganas is 2, the rendering direction is the rendering in the transverse direction from left to right, and "雨" can be segmented into two sub-pixels from left to right. The sub-pixels on the left half side corresponds to the furigana "あ" and the rendering duration is 200 ms. The sub-pixels on the right half side corresponds to the furigana "め" and the rendering duration is 100 ms. For another example, as shown in FIG. 6, "欠片" (meaning "fragment" in Chinese) in Japanese has three furiganas "かけら," and the pixels of "欠片" may be segmented into three equal parts equally. The rendering duration of the first part is equal to the rendering duration of "か," and is 50 ms. The rendering duration of the second part is equal to the rendering duration of "け," and is 40 ms. The rendering duration of the third part is equal to the rendering duration of "ら," and is 50 ms.

Then, the terminal may dye each furigana and the sub-pixels obtained by segmentation and corresponding to the furigana within the rendering duration of each furigana in the pronunciation of the polyphonic word to be rendered. The above "雨" in Japanese is still taken as the example, the original color of "雨" is red. Within 200 ms, the left half sub-pixels of "雨" is dyed at a uniform speed and turns yellow, and meanwhile, "あ" in the pronunciation is dyed at the same uniform speed, such that the left half sub-pixels of "雨" and "あ" are dyed synchronously. Then within 100 ms, the right half sub-pixels of "雨" is dyed at a uniform speed, and meanwhile, "め" in the pronunciation is dyed at the same uniform speed, such that the right half sub-pixels of "雨" and "め" are synchronously dyed. In this way, synchronous rendering can be achieved.

Optionally, the target lyrics are Japanese lyrics. At first, whether a contracted sound exists in the pronunciation of the polyphonic word to be rendered may be determined, and then rendering is determined based on the contracted sound. The corresponding processing may be as follows:

It is determined that the contracted sound exists in the kana of the pronunciation of the polyphonic word to be rendered, and the polyphonic word to be rendered and each furigana in the polyphonic word to be rendered are word-by-word rendered simultaneously according to the first number and the playback time information of the pronunciation of the polyphonic word to be rendered.

The contracted sound does not occupy syllables in Japanese, that is, if the pronunciation includes two furiganas, one of which is a contracted sound, actually only one syllable is occupied. For example, "ア" in "ファンタジー" (meaning "fantasy" in Chinese) in Japanese is a contracted sound, and thus the number of syllables of "ファンタジー" is 5 (that is, " ").

In the practice, the terminal may acquire at least one pre-stored contracted sound in advance and then match the pronunciation of the polyphonic word to be rendered with the at least one contracted sound. If the pronunciation of the polyphonic word to be rendered includes the contracted sound in the at least one contracted sound, it is determined that the contracted sound exists in the kana of the pronunciation of the polyphonic word to be rendered. If the pronunciation of the polyphonic word to be rendered does not include any of the at least one contracted sound, it is determined that no contracted sound exists in the kana of the pronunciation of the polyphonic word to be rendered.

After determining that the contracted sound exists in the kana of the pronunciation of the polyphonic word to be rendered, the terminal may perform word-by-word rendering on the polyphonic word to be rendered and each furigana in the polyphonic word to be rendered simultaneously according to the first number and playback time information of the pronunciation of the polyphonic word to be rendered, to achieve the rendering effect, thereby achieving the synchronous rendering of the pronunciation and the polyphonic words to be rendered (the rendering here may refer to the previous detailed description, which will not be repeated).

Optionally, another method may be configured to perform the rendering according to the contracted sound, and the corresponding processing may be as follows:

The number of contracted sounds is subtracted from the first number to obtain a second number. According to the second number and the playback time information of the pronunciation of the polyphonic word to be rendered, the polyphonic word to be rendered and each furigana in the pronunciation of the polyphonic word to be rendered are word-by-word rendered simultaneously.

In the practice, after determining that the contracted sound exists in the kana of the pronunciation of the polyphonic word to be rendered, the terminal subtracts the number of contracted sounds from the first number to obtain the second number (the second number is actually the number of syllables contained in the polyphonic word to be rendered). Then the polyphonic word and each furigana in the pronunciation of the polyphonic word to be rendered are word-by-word rendered simultaneously according to the second number and the playback time information of the pronunciation of the polyphonic word to be rendered, to achieve the rendering effect, thereby achieving synchronous rendering of the pronunciation and the polyphonic word to be rendered.

Optionally, the rendering according to the second number may be as follows:

The rendering duration of each syllable in the pronunciation of the polyphonic word is determined according to the playback time information of the pronunciation of the polyphonic word to be rendered. The pixels of the polyphonic word to be rendered is segmented into the second number of sub-pixels equally in the rendering direction. According to the rendering direction, the sub-pixels obtained by segmentation are made to be in one-to-one correspondence with the syllables in the pronunciation of the polyphonic word to be rendered. For each syllable in the pronunciation of the polyphonic word to be rendered, the syllable and the sub-pixels obtained by segmentation and corresponding to the syllable are word-by-word rendered simultaneously within the rendering duration of the syllable.

In the practice, when the second number is configured for the rendering of the polyphonic word, the contracted sound may share a rendering start identifier with the furigana, and the contracted sound and the previous furigana occupy one syllable. If the playback time information of the pronunciation of the polyphonic word to be rendered is the rendering start time of each syllable (also referred to as a timestamp), the start display time of two consecutive syllables may be subjected to subtraction to obtain the rendering duration except the last syllable. The rendering duration of the last syllable is the rendering start time of the to-be-song lyrics adjacent to the polyphonic word to be rendered minus the rendering start duration of the syllable. For example, the pronunciation of "幻想" (meaning "fantasy" in Chinese) in Japanese is "フタンタジー," wherein "ア" is a contracted sound, "ア" and "フ" occupy a syllable and share a rendering start duration, and the common rendering duration of "ファ" is the rendering start time of "ン" minus the rendering start time of "フ ァ." In addition, the playback time information of the pronunciation of the polyphonic word to be rendered may also be the rendering start time of each furigana (also referred to as timestamp). The rendering duration of each furigana may be determined in the previous way, and the rendering durations of "ア" and "フ" are added to obtain the common rendering duration of "フ ァ."

If the playback time information of the pronunciation of the polyphonic word to be rendered is in an implicit manner (the rendering start time of the first furigana of the pronunciation is not displayed in the implicit fashion, described in detail later), the rendering duration of each syllable in the pronunciation of the polyphonic word to be rendered can be determined according to the rendering start time of the word corresponding to the polyphonic word to be rendered in the lyrics.

After the rendering duration of each furigana is determined, the pixels of the word to be rendered may be segmented into the second number of sub-pixels equally in the rendering direction, and then the equally segmented sub-pixels are caused to be in one-to-one correspondence with the furiganas. For example, the above "幻想" in Japanese is still taken as an example, the second number of the syllables is 5, the rendering direction is the transverse direction from left to right, and "幻想." can be segmented into five sub-pixels from left to right. From left to right, the first sub-pixels corresponds to "ファ." the second sub-pixels corresponds to "ン," the third sub-pixels corresponds to "タ." the fourth sub-pixels corresponds to "ジ." and the fifth sub-pixels corresponds to "―."

Then, the terminal may dye each syllable and the sub-pixels obtained by segmentation and corresponding to each syllable within the rendering duration of each syllable in the pronunciation of the polyphonic word to be rendered. For example, the above "幻想" in Japanese is still taken as an example. The original color of "幻想" is red. During the rendering duration of "ファ," the first sub-pixels of "幻想" is dyed at a uniform speed, and "ファ" in the pronunciation is also dyed at the same uniform speed, such that the first sub-pixels of "fantasy" and "ファ" are synchronously dyed. The other parts are rendered similarly and are not listed one by one. In this way, synchronous rendering can be achieved.

It should be noted that when the contracted sound exists in the above pronunciation, the rendering is performed in two ways. In fact, as long as the rendering start identifier of each furigana in each pronunciation can be determined, the rendering can be performed according to the first number or according to the second number. Since the total rendering duration of "ファ" is the same, there is no actual difference between the two manners.

It should also be noted that the above rendering direction is the rendering in the transverse direction from left to right, and the rendering direction in the embodiment of the present disclosure may also be the rendering in the longitudinal direction from top to bottom, that is, when a column of lyrics is displayed, the rendering is performed word by word from top to bottom.

It should also be noted that the foregoing takes the fact that the terminal plays the audio as an example. The method can also be configured for the device of KTV to render lyrics, that is, any lyrics in the karaoke format can be rendered in such method. The embodiment of the present disclosure describes the solution by using the songs in Japanese, and the method can also be configured for rendering the polyphonic words of the lyrics in other languages, for example. French. English. and the like.

In addition, in the embodiment of the present disclosure, a manner for pre-storing the pronunciation of the target lyrics is also provided, and the corresponding processing may be as follows:

The technician can determine the pronunciation of each polyphonic word in the target lyrics, and mark the rendering start identifier for each furigana in the pronunciation of any polyphonic word, and the rendering start identifier of the first furigana in the pronunciation is the same as the rendering start identifier of the polyphonic word. In this way, the pronunciation corresponding to the polyphonic word can be found. Then, the polyphonic word and the rendering start identifier corresponding to the polyphonic word may be stored in the additional part of the target lyrics text in the format of "kana: [rendering start identifier] furigana [rendering start identifier] furigana . . . " Similarly, it may also be stored in the additional part of the target lyrics text in the format of "syllables: [rendering start identifier] furigana [rendering start identifier] furigana," and the additional part may be the above Meta paragraph. In this way, the pronunciation-related information is added to the original Meta paragraph. Since an analysis mechanism for the Meta paragraph is relatively loose, even if the pronunciation-related information is added to the original Meta paragraph, the format change is not affected, and abnormality in the audio application program is also not caused.

Alternatively, in Japanese, the same character may have different pronunciations if forming another word with different characters, and therefore, the terminal can follow the longest matching manner (for example, for "思出" in Japanese, the pronunciation of "思" in "思い出を" (meaning "memorize" in Chinese) is "おも," and the pronunciation of "出" is "で," the pronunciation of "思" in "思い出し" (meaning "please remember the memory" in Chinese) is "おも," and the pronunciation of "出" is "だ"). During the actual search of the dictionary, the longest matching principle can be configured to search for the word behind the polyphonic word to acquire the pronunciation of the polyphonic word), and the pronunciation of each polyphonic word is determined. For the pronunciation of any polyphonic word, the pronunciation is enabled to correspond to the polyphonic word in the target lyrics, and the rendering start identifier of the pronunciation is determined as the rendering start identifier of the first furigana in the pronunciation. Besides, according to the rendering start identifier and the audio of the target lyrics, the rendering start identifiers are marked for other furiganas in the pronunciation other than the first furigana. Then, the polyphonic word and the rendering start identifier corresponding to the polyphonic word may be stored in the additional part of the target lyrics text in the format of "kana: [rendering start identifier] furigana [rendering start identifier] furigana . . . ." Similarly, it may also be stored in the additional part of the target lyrics text in the format of "syllables: [rendering start identifier] furigana [rendering start identifier] furigana . . . " and the additional part may be the above Meta paragraph.

In addition, the above implicit fashion may be the marking of an implicit rendering start identifier, for example, for "欠片の絆" in Japanese (meaning "bonding of fragments" in Chinese), the pronunciation of " " is "かけら," the pronunciation of "絆" is "きずな," and "の" is not a polyphonic word, and does not need to be marked. When the pronunciations are stored, the pronunciation of "欠片の絆" may be stored as "2 か(1000,500)け(1500, 500) ら (2000,1000)1 き ず な," wherein "2" represents the pronunciations of two latter characters. i.e., the pronunciation of "欠片," and "1" represents the pronunciation of one latter character. i.e., the pronunciation of "絆". The first "1000" represents the rendering start time of "か," "1500" represents the rendering start time of "け," "2000" represents the rendering start time of "ら," "500" represents the rendering duration of "か" and "け," and the last "1000" represents the rendering duration of "ら." The rendering duration for the three furiganas of "絆" is the same, and thus only "1" needs to be marked, and the rendering duration of "きずな" may be determined according to the rendering start duration of "き" and the rendering start time of the word behind the target lyrics "絆" (the absolute value of the difference between the two can be solved). Upon the marking in the implicit fashion, the pronunciations can also be stored in the additional part (which may be the Meta paragraph) of the target lyrics text in the order of the polyphonic words in the lyrics.

When the pronunciation of the polyphonic word to be rendered is subsequently acquired, the terminal may determine the polyphonic word in the lyrics, and if the polyphonic word is the first polyphonic word, the initial pronunciation is acquired, and the number of characters of the pronunciation is checked, if the polyphonic word is the second polyphonic word, the second pronunciation is acquired, the number of characters of the pronunciation is checked, and then the pronunciation of the polyphonic word to be rendered can be acquired. For the playback time information of the polyphonic word to be rendered, if the rendering start identifier and the rendering duration are marked in the pronunciation of the polyphonic word to be rendered, the rendering start identifier and the rendering duration can be directly obtained. If the rendering start identifier is not marked, the rendering start identifier can be determined according to the rendering start identifier per se and the rendering start identifier of the next word (for example, the rendering start indicator is the rendering start time, the absolute value of the time difference is solved, and the absolute value is divided by the number of furiganas in the pronunciation to obtain the rendering duration of each furigana). Hence, the playback time information of the pronunciation of the polyphonic word to be rendered can be determined.

It should be noted that the above Meta paragraph may be located behind the target lyrics text, or may be located in front of the target lyrics text.

In the embodiment of the present disclosure, in the process of rendering the lyrics, the pronunciation of the polyphonic word to be rendered can be displayed above or below the polyphonic word to be rendered, and the pixels of the polyphonic word to be rendered is segmented and a plurality of sub-pixels of the same size are obtained. Each sub-pixel is rendered in synchronization with the furigana, thereby enabling the rendering of the lyrics more reasonable, and providing a method for rendering the lyrics.

Figure 7:
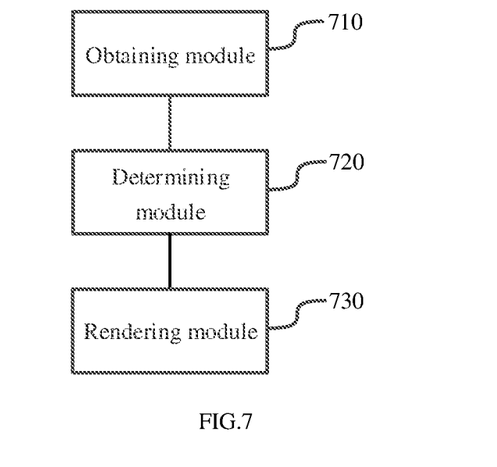
FIG. 7 is a schematic structural diagram of an apparatus for rendering lyrics according to an embodiment of the present disclosure.

According to the same technical concept, the embodiment of the present disclosure further provides an apparatus for rendering lyrics, as shown in FIG. 7, the apparatus includes:

an acquiring module 710, configured to acquire pronunciation of a polyphonic word to be rendered in target lyrics, and acquire playback time information of the pronunciation in the process of rendering the target lyrics;

a determining module 720, configured to determine a first number of furiganas contained in the pronunciation; and a rendering module 730, configured to word-by-word render, according to the first number and the playback time information of the pronunciation of the polyphonic word to be rendered, the polyphonic word to be rendered and each furigana in the pronunciation of the polyphonic word to be rendered simultaneously, wherein the pronunciation of the polyphonic word to be rendered is adjacent to and parallel to the polyphonic word to be rendered.

Optionally, the target lyrics are Japanese lyrics.

The determining module 720 is further configured to:

determine that a contracted sound exists in the furigana of the pronunciation of the polyphonic word to be rendered.

Optionally, the rendering module 730 is configured to:

determine, according to the playback time information of the pronunciation of the polyphonic word to be rendered, a rendering duration of each furigana in the pronunciation of the polyphonic word to be rendered;

segment pixels of the polyphonic word to be rendered into a first number of sub-pixels equally in a rendering direction;

cause, according to the rendering direction, the sub-pixels obtained by segmentation, to be in one-to-one correspondence with the furiganas in the pronunciation of the polyphonic word to be rendered; and word-by-word render, for each furigana in the pronunciation of the polyphonic word to be rendered, the furigana and the sub-pixels obtained by segmentation and corresponding to the furigana simultaneously within the rendering duration of the furigana.

Optionally, the rendering module 730 is configured to:

obtain a second number by subtracting the number of contracted sounds from the first number, and word-by-word render, according to the second number and the playback time information of the pronunciation of the polyphonic word to be rendered, the polyphonic word to be rendered and each furigana in the pronunciation of the polyphonic word to be rendered simultaneously.

Optionally, the rendering module 730 is configured to:

determine, according to the playback time information of the pronunciation of the polyphonic word to be rendered, a rendering duration of each syllable in the pronunciation of the polyphonic word;

segment pixels of the polyphonic word to be rendered into a second number of sub-pixels equally in a rendering direction:

cause, according to the rendering direction, the sub-pixels obtained by segmentation to be in one-to-one correspondence with the syllables in the pronunciation of the polyphonic word to be rendered; and word-by-word render, for each syllable in the pronunciation of the polyphonic word to be rendered, the syllable and the sub-pixels obtained by segmentation and corresponding to the syllable simultaneously within the rendering duration of the syllable.

Optionally, the obtaining module 710 is configured to:

acquire the pronunciation of the polyphonic word to be rendered in the target lyrics from an additional part of a text of the target lyrics, and acquire a rendering start identifier of each furigana in the pronunciation; and determine the rendering start identifier of each furigana in the pronunciation as the playback time information of the pronunciation.

In the embodiment of the present disclosure, in the process of rendering the lyrics, the pronunciation of the polyphonic word to be rendered can be displayed above or below the polyphonic word to be rendered, and the pixels of the polyphonic word to be rendered is segmented and a plurality of sub-pixels of the same size are obtained. Each sub-pixel is rendered in synchronization with the furigana, thereby enabling the rendering of the lyrics more reasonable, and providing a method for rendering the lyrics.

It should be noted that the apparatus for rendering lyrics according to this embodiment only takes division of all the functional modules as an example for explanation when rendering lyrics. In practice, the above functions can be finished by the different functional modules as required. That is, the internal structure of the apparatus is segmented into different functional modules to finish all or part of the functions described above. In addition, the apparatus for rendering lyrics according to this embodiment is according to the same concept as the method for rendering lyrics according to the foregoing embodiment. For the specific implementation process of the apparatus, reference may be made to the method embodiment, which is not repeated herein.

Figure 8:
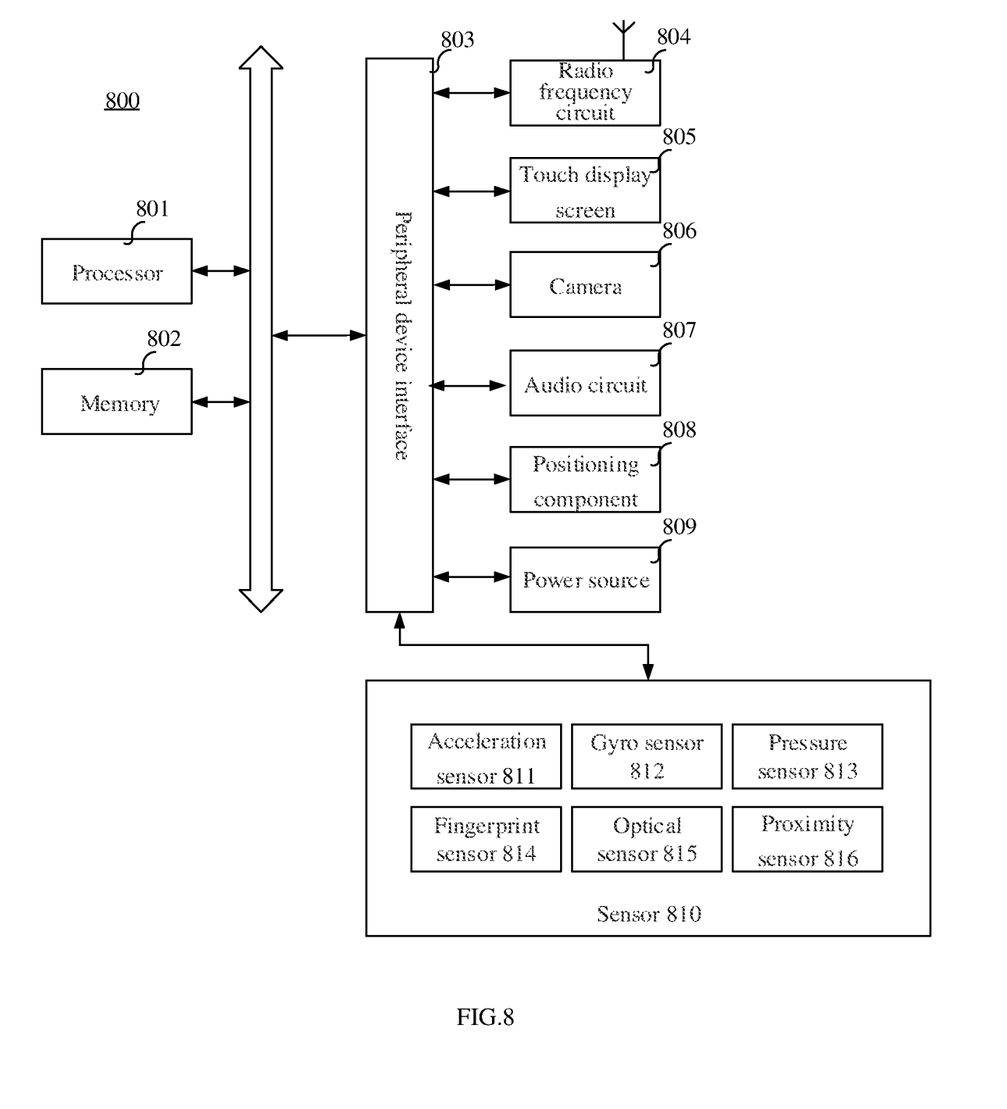
FIG. 8 is a schematic structural diagram of a terminal according to an embodiment of the present disclosure.

FIG. 8 is a structural block diagram of a terminal 800 according to one embodiment of the present disclosure. The terminal 800 may be a smart phone, a tablet computer, a Moving Picture Experts Group Audio Layer III (MP3)

player, a Moving Picture Experts Group Audio Layer IV (MP4) player, a laptop or desk computer. The terminal 800 may also be called a user equipment (UE), a portable terminal, a laptop terminal, a desk terminal, or the like.

Generally, the terminal 800 includes a processor 801 and a memory 802.

The processor 801 may include one or more processing cores, such as a 4-core processor and an 8-core processor. The processor 801 may be formed by at least one hardware of a digital signal processor (DSP), a field-programmable gate array (FPGA), and a programmable logic array (PLA). The processor 801 may also include a main processor and a coprocessor. The main processor is a processor for processing the data in an awake state, and is also called a central processing unit (CPU). The coprocessor is a low-power-consumption processor for processing the data in a standby state. In some embodiments, the processor 801 may be integrated with a graphics processing unit (GPU), which is configured to render and draw the content that needs to be rendered by a display screen. In some embodiments, the processor 801 may also include an Artificial Intelligence (AI) processor configured to process computational operations related to machine learning.

The memory 802 may include one or more computer-readable storage mediums, which can be non-transitory. The memory 802 may also include a high-speed random access memory, as well as a non-volatile memory, such as one or more disk storage devices and flash storage devices. In some embodiments, the non-transitory computer-readable storage medium in the memory 802 is configured to store at least one instruction. The at least one instruction is configured to be executed by the processor 801 to implement the method for rendering lyrics according to the method embodiments of the present disclosure.

In some embodiments, the terminal 800 also optionally includes a peripheral device interface 803 and at least one peripheral device. The processor 801, the memory 802, and the peripheral device interface 803 may be connected by a bus or a signal line. Each peripheral device may be connected to the peripheral device interface 803 by a bus, a signal line or a circuit board. For example, the peripheral device includes at least one of a radio frequency circuit 804, a display screen 805, a camera component 806, an audio circuit 807, a positioning component 808, and a power source 809.

The peripheral device interface 803 may be configured to connect at least one peripheral device associated with an input/output (I/O) to the processor 801 and the memory 802. In some embodiments, the processor 801, the memory 802 and the peripheral device interface 803 are integrated on the same chip or circuit board. In some other embodiments, any one or two of the processor 801, the memory 802 and the peripheral device interface 803 may be implemented on a separate chip or circuit board, which is not limited in this embodiment.

The radio frequency circuit 804 is configured to receive and transmit a radio frequency (RF) signal, which is also referred to as an electromagnetic signal. The radio frequency circuit 804 communicates with a communication network and other communication devices via the electromagnetic signal. The radio frequency circuit 804 converts the electrical signal into the electromagnetic signal for transmission, or converts the received electromagnetic signal into the electrical signal. Optionally, the radio frequency circuit 804 includes an antenna system, an RF transceiver, one or more amplifiers, a tuner, an oscillator, a digital signal processor, a codec chipset, a subscriber identity module card, and the like. The radio frequency circuit 804 can communicate with other terminals via at least one wireless communication protocol. The wireless communication protocol includes, but not limited to, the World Wide Web, a metropolitan area network, an intranet, various generations of mobile communication networks (2G, 3G, 4G, and 5G), a wireless local area network, and/or a wireless fidelity (Wi-Fi) network. In some embodiments, the RF circuit 804 may also include near-field communication (NFC) related circuits, which is not limited in the present disclosure.

The display screen 805 is configured to display a user interface (UI). The UI may include graphics, text, icons, videos, and any combination thereof. When the display screen 805 is a touch display screen, the display screen 805 also has the capacity to acquire touch signals on or over the surface of the display screen 805. The touch signal may be input into the processor 801 as a control signal for processing. At this time, the display screen 805 may also be configured to provide virtual buttons and/or virtual keyboards, which are also referred to as soft buttons and/or soft keyboards. In some embodiments, one display screen 805 may be disposed on the front panel of the terminal 800. In some other embodiments, at least two display screens 805 may be disposed respectively on different surfaces of the terminal 800 or in a folded design. In further embodiments, the display screen 805 may be a flexible display screen disposed on the curved or folded surface of the terminal 800. Even the display screen 805 may have an irregular shape other than a rectangle; that is, the display screen 805 may be an irregular-shaped screen. The display screen 805 may be a liquid crystal display (LCD) screen, an organic light-emitting diode (OLED), or the like.

The camera component 806 is configured to capture images or videos. In some embodiments of the present disclosure, the camera component 806 includes a front camera and a rear camera. Usually, the front camera is placed on the front panel of the terminal, and the rear camera is placed on the back of the terminal. In some embodiments, at least two rear cameras are disposed, and are at least one of a main camera, a depth-of-field camera, a wide-angle camera, and a telephoto camera respectively, so as to realize a background blurring function achieved by fusion of the main camera and the depth-of-field camera, panoramic shooting and virtual reality (VR) shooting functions achieved by fusion of the main camera and the wide-angle camera or other fusion shooting functions. In some embodiments, the camera component 806 may also include a flashlight. The flashlight may be a mono-color temperature flashlight or a two-color temperature flashlight. The two-color temperature flash is a combination of a warm flashlight and a cold flashlight and can be used for light compensation at different color temperatures.

The audio circuit 807 may include a microphone and a speaker. The microphone is configured to collect sound waves of users and environments, and convert the sound waves into electrical signals which are input into the processor 801 for processing, or input into the RF circuit 804 for voice communication. For the purpose of stereo acquisition or noise reduction, there may be a plurality of microphones respectively disposed at different locations of the terminal 800. The microphone may also be an array microphone or an omnidirectional acquisition microphone. The speaker is then configured to convert the electrical signals from the processor 801 or the radio frequency circuit 804 into the sound waves. The speaker may be a conventional film speaker or a piezoelectric ceramic speaker. When the speaker is the piezoelectric ceramic speaker, the electrical signal can be converted into not only human-audible sound waves but also the sound waves which are inaudible to humans for the purpose of ranging and the like. In some embodiments, the audio circuit 807 may also include a headphone jack.

The positioning component 808 is configured to locate the current geographic location of the terminal 800 to implement navigation or a location based service (LBS). The positioning component 808 may be the global positioning system (GPS) from the United States, the Beidou positioning system from China, the Grenas satellite positioning system from Russia or the Galileo satellite navigation system from the European Union.

The power source 809 is configured to power up various components in the terminal 800. The power source 809 may be alternating current, direct current, a disposable battery, or a rechargeable battery. When the power source 809 includes the rechargeable battery, the rechargeable battery may a wired rechargeable battery or a wireless rechargeable battery. The rechargeable battery may also support the fast charging technology.

In some embodiments, terminal 800 also includes one or more sensors 810. The one or more sensors 810 include, but not limited to, an acceleration sensor 811, a gyro sensor 812, a pressure sensor 813, a fingerprint sensor 814, an optical sensor 815 and a proximity sensor 816.

The acceleration sensor 811 may detect magnitudes of accelerations on three coordinate axes of a coordinate system established by the terminal 800. For example, the acceleration sensor 811 may be configured to detect components of a gravitational acceleration on the three coordinate axes. The processor 801 may control the display screen 805 to display a user interface in a landscape view or a portrait view according to a gravity acceleration signal collected by the acceleration sensor 811. The acceleration sensor 811 may also be configured to collect motion data of a game or a user.

The gyro sensor 812 can detect a body direction and a rotation angle of the terminal 800, and can cooperate with the acceleration sensor 811 to collect a 3D motion of the user on the terminal 800. According to the data collected by the gyro sensor 812, the processor 801 can serve the following functions: motion sensing (such as changing the UI according to a user's tilt operation), image stabilization during shooting, game control and inertial navigation.

The pressure sensor 813 may be disposed on a side frame of the terminal 800 and/or a lower layer of the display screen 805. When the pressure sensor 813 is disposed on the side frame of the terminal 800, a user's holding signal to the terminal 800 can be detected. The processor 801 can perform left-right hand recognition or quick operation according to the holding signal collected by the pressure sensor 813. When the pressure sensor 813 is disposed on the lower layer of the display screen 805, the processor 801 controls an operable control on the UI according to a user's pressure operation on the display screen 805. The operable control includes at least one of a button control, a scroll bar control, an icon control and a menu control.

The fingerprint sensor 814 is configured to collect a user's fingerprint. The processor 801 identifies the user's identity according to the fingerprint collected by the fingerprint sensor 814, or the fingerprint sensor 814 identifies the user's identity according to the collected fingerprint. When the user's identity is identified as trusted, the processor 801 authorizes the user to perform related sensitive operations, such as unlocking the screen, viewing encrypted information, downloading software, paying, and changing settings. The fingerprint sensor 814 may be provided on the front, back, or side of the terminal 800. When the terminal 800 is provided with a physical button or a manufacturer's logo, the fingerprint sensor 814 may be integrated with the physical button or the manufacturer's logo.

The optical sensor 815 is configured to collect ambient light intensity. In one embodiment, the processor 801 may control the display brightness of the display screen 805 according to the ambient light intensity collected by the optical sensor 815. For example, when the ambient light intensity is high, the display brightness of the display screen 805 is increased; and when the ambient light intensity is low, the display brightness of the display screen 805 is decreased. In another embodiment, the processor 801 may also dynamically adjust shooting parameters of the camera component 806 according to the ambient light intensity collected by the optical sensor 815.

The proximity sensor 816, also referred to as a distance sensor, is usually disposed on the front panel of the terminal 800. The proximity sensor 816 is configured to capture a distance between the user and a front surface of the terminal 800. In one embodiment, when the proximity sensor 816 detects that the distance between the user and the front surface of the terminal 800 becomes gradually smaller, the processor 801 controls the display screen 805 to switch from a screen-on state to a screen-off state. When it is detected that the distance between the user and the front surface of the terminal 800 gradually increases, the processor 801 controls the display screen 805 to switch from the screen-off state to the screen-on state.

It will be understood by those skilled in the art that the structure shown in FIG. 8 does not constitute a limitation to the terminal 800, and may include more or less components than those illustrated, or combine some components or adopt different component arrangements.

Persons of ordinary skill in the art can understand that all or part of the steps described in the above embodiments can be completed through hardware, or through relevant hardware instructed by applications stored in a non-transitory computer readable storage medium, such as a read-only memory, a disk, or a CD.

Described above are merely exemplary embodiments of the present disclosure, and are not intended to limit the present disclosure. Within the spirit and principles of the disclosure, any modifications, equivalent substitutions, improvements, and the like are within the protection scope of the present disclosure.

What is claimed is:

1. A method for rendering lyrics, comprising:
   acquiring pronunciation of a polyphonic word to be rendered in target lyrics, and acquiring playback time information of the pronunciation in the process of rendering the target lyrics, wherein the target lyrics are Japanese lyrics and the polyphonic word to be rendered comprises a word having multiple pronunciations, and the pronunciation of the polyphonic word to be rendered is adjacent to and parallel to the polyphonic word to be rendered;
   determining a first number of furiganas contained in the pronunciation, and determining whether a contracted sound exists in a furigana of the pronunciation of the polyphonic word to be rendered, wherein the contracted sound does not occupy syllables in the pronunciation of the polyphonic word to be rendered;
   word-by-word rendering, according to the first number and the playback time information of the pronunciation of the polyphonic word to be rendered, the polyphonic word to be rendered and each furigana in the pronunciation of the polyphonic word to be rendered simultaneously, based at least in part on determining that a contracted sound exists in a furigana of the pronunciation;

wherein, when the contracted sound does not exist in the furigana of the pronunciation of the polyphonic word to be rendered, the method comprises:

word-by-word rendering, according to the first number and the playback time information of the pronunciation of the polyphonic word to be rendered, the polyphonic word to be rendered and each furigana in the pronunciation of the polyphonic word to be rendered simultaneously, where the word-by-word rendering when the contracted sound does not exist in the furigana of the pronunciation comprises:

determining, according to the playback time information of the pronunciation of the polyphonic word to be rendered, a rendering duration of each furigana in the pronunciation of the polyphonic word to be rendered;

segmenting pixels of the polyphonic word to be rendered into the first number of sub-pixels equally in a first rendering direction;

causing, according to the first rendering direction, the first number of sub-pixels obtained by segmentation to be in one-to-one correspondence with the furiganas in the pronunciation of the polyphonic word to be rendered; and word-by-word rendering, for each furigana in the pronunciation of the polyphonic word to be rendered, the furigana and the sub-pixels of the first number of sub-pixels obtained by segmentation and corresponding to the furigana simultaneously within the rendering duration of the furigana.

2. The method according to claim 1, wherein, when the contracted sound exists in the furigana of the pronunciation of the polyphonic word to be rendered, word-by-word rendering, according to the first number and the playback time information of the pronunciation of the polyphonic word to be rendered, the polyphonic word to be rendered and each furigana in the pronunciation of the polyphonic word to be rendered simultaneously comprises:

obtaining a second number by subtracting a number of the contracted sounds from the first number; and word-by-word rendering, according to the second number and the playback time information of the pronunciation of the polyphonic word to be rendered, the polyphonic word to be rendered and each furigana in the pronunciation of the polyphonic word to be rendered simultaneously.

3. The method according to claim 2, wherein word-by-word rendering, according to the second number and the playback time information of the pronunciation of the polyphonic word to be rendered, the polyphonic word to be rendered and each furigana in the pronunciation of the polyphonic word to be rendered simultaneously comprises:

determining, according to the playback time information of the pronunciation of the polyphonic word to be rendered, a rendering duration of each syllable in the pronunciation of the polyphonic word;

segmenting pixels of the polyphonic word to be rendered into the second number of sub-pixels equally in a second rendering direction;

causing, according to the rendering direction, the second number of sub-pixels obtained by segmentation to be in one-to-one correspondence with the syllables in the pronunciation of the polyphonic word to be rendered; and word-by-word rendering, for each syllable in the pronunciation of the polyphonic word to be rendered, the syllable and the sub-pixels of the second number of sub-pixels obtained by segmentation and corresponding to the syllable simultaneously within the rendering duration of the syllable.

4. The method according to claim 1, wherein acquiring the pronunciation of the polyphonic word to be rendered in the target lyrics and acquiring the playback time information of the pronunciation comprises:

acquiring the pronunciation of the polyphonic word to be rendered in the target lyrics from an additional part of a text of the target lyrics, and acquiring a rendering start identifier of each furigana in the pronunciation; and determining the rendering start identifier of each furigana in the pronunciation as the playback time information of the pronunciation.

5. An apparatus for rendering lyrics, comprising:

a processor; and a memory configured to store at least one instruction executable by the processor;

wherein the processor, when running the at least one instruction, is caused to:

acquire a pronunciation of a polyphonic word to be rendered in target lyrics, and acquire playback time information of the pronunciation in the process of rendering the target lyrics, wherein the target lyrics are Japanese lyrics and the polyphonic word to be rendered comprises a word having multiple pronunciations, and the pronunciation of the polyphonic word to be rendered is adjacent to and parallel to the polyphonic word to be rendered;

determine a first number of furiganas contained in the pronunciation, and determine whether a contracted sound exists in a furigana of the pronunciation of the polyphonic word to be rendered, wherein the contracted sound does not occupy syllables in the pronunciation of the polyphonic word to be rendered;

word-by-word render, according to the first number and the playback time information of the pronunciation of the polyphonic word to be rendered, the polyphonic word to be rendered and each furigana in the pronunciation of the polyphonic word to be rendered simultaneously, based at least in part on determining that a contracted sound exists in a furigana of the pronunciation;

wherein, when the contracted sound does not exist in the furigana of the pronunciation of the polyphonic word to be rendered, the processor is caused to:

word-by-word render, according to the first number and the playback time information of the pronunciation of the polyphonic word to be rendered, the polyphonic word to be rendered and each furigana in the pronunciation of the polyphonic word to be rendered simultaneously, where the word-by-word rendering when the contracted sound does not exist in the furigana of the pronunciation comprises:

determining, according to the playback time information of the pronunciation of the polyphonic word to be rendered, a rendering duration of each furigana in the pronunciation of the polyphonic word to be rendered;

segmenting pixels of the polyphonic word to be rendered into the first number of sub-pixels equally in a first rendering direction;

causing, according to the first rendering direction, the first number of sub-pixels obtained by segmentation to be in one-to-one correspondence with the furiganas in the pronunciation of the polyphonic word to be rendered; and word-by-word rendering, for each furigana in the pronunciation of the polyphonic word to be rendered, the furigana and the sub-pixels obtained by segmentation and corresponding to the furigana simultaneously within the rendering duration of the furigana.

6. The apparatus according to claim 5, wherein when the contracted sound exists in the furigana of the pronunciation of the polyphonic word to be rendered, word-by-word rendering, according to the first number and the playback time information of the pronunciation of the polyphonic word to be rendered, the polyphonic word to be rendered and each furigana in the pronunciation of the polyphonic word to be rendered simultaneously comprises:

obtaining a second number by subtracting a number of the contracted sounds from the first number; and word-by-word rendering, according to the second number and the playback time information of the pronunciation of the polyphonic word to be rendered, the polyphonic word to be rendered and each furigana in the pronunciation of the polyphonic word to be rendered simultaneously.

7. The apparatus according to claim 6, wherein the processor, when running the at least one instruction, is caused to:

determine, according to the playback time information of the pronunciation of the polyphonic word to be rendered, a rendering duration of each syllable in the pronunciation of the polyphonic word;

segment pixels of the polyphonic word to be rendered into the second number of sub-pixels equally in a second rendering direction;

causing, according to the second rendering direction, the second number of sub-pixels obtained by segmentation to be in one-to-one correspondence with the syllables in the pronunciation of the polyphonic word to be rendered; and word-by-word rendering, for each syllable in the pronunciation of the polyphonic word to be rendered, the syllable and the sub-pixels of the second number of sub-pixels obtained by segmentation and corresponding to the syllable simultaneously within the rendering duration of the syllable.

8. The apparatus according to claim 5, wherein the processor, when running the at least one instruction, is caused to:

acquire the pronunciation of the polyphonic word to be rendered in the target lyrics from an additional part of a text of the target lyrics, and acquire a rendering start identifier of each furigana in the pronunciation; and determine the rendering start identifier of each furigana in the pronunciation as the playback time information of the pronunciation.

9. A non-transitory computer-readable storage medium for storing a computer program, wherein the computer program, when run by a processor, causes the processor to perform:

acquiring pronunciation of a polyphonic word to be rendered in target lyrics, and acquiring playback time information of the pronunciation in the process of rendering the target lyrics, wherein the target lyrics are Japanese lyrics and the polyphonic word to be rendered comprises a word having multiple pronunciations, and the pronunciation of the polyphonic word to be rendered is adjacent to and parallel to the polyphonic word to be rendered;

determining a first number of furiganas contained in the pronunciation, and determining whether a contracted sound exists in a furigana of the pronunciation of the polyphonic word to be rendered, wherein the contracted sound does not occupy syllables in the pronunciation of the polyphonic word to be rendered;

word-by-word rendering, according to the first number and the playback time information of the pronunciation of the polyphonic word to be rendered, the polyphonic word to be rendered and each furigana in the pronunciation of the polyphonic word to be rendered simultaneously, based at least in part on determining that a contracted sound exists in a furigana of the pronunciation;

wherein, when the contracted sound does not exist in the furigana of the pronunciation of the polyphonic word to be rendered, the method comprises:

word-by-word rendering, according to the first number and the playback time information of the pronunciation of the polyphonic word to be rendered, the polyphonic word to be rendered and each furigana in the pronunciation of the polyphonic word to be rendered simultaneously, where the word-by-word rendering when the contracted sound does not exist in the furigana of the pronunciation comprises:

determining, according to the playback time information of the pronunciation of the polyphonic word to be rendered, a rendering duration of each furigana in the pronunciation of the polyphonic word to be rendered;

segmenting pixels of the polyphonic word to be rendered into the first number of sub-pixels equally in a first rendering direction;

causing, according to the first rendering direction, the first number of sub-pixels obtained by segmentation to be in one-to-one correspondence with the furiganas in the pronunciation of the polyphonic word to be rendered; and word-by-word rendering, for each furigana in the pronunciation of the polyphonic word to be rendered, the furigana and the sub-pixels of the first number of sub-pixels obtained by segmentation and corresponding to the furigana simultaneously within the rendering duration of the furigana.

10. The storage medium according to claim 9, wherein, when the contracted sound exists in the furigana of the pronunciation of the polyphonic word to be rendered, word-by-word rendering, according to the first number and the playback time information of the pronunciation of the polyphonic word to be rendered, the polyphonic word to be rendered and each furigana in the pronunciation of the polyphonic word to be rendered simultaneously comprises:

obtaining a second number by subtracting a number of the contracted sounds from the first number; and word-by-word rendering, according to the second number and the playback time information of the pronunciation of the polyphonic word to be rendered, the polyphonic word to be rendered and each furigana in the pronunciation of the polyphonic word to be rendered simultaneously.

11. The storage medium according to claim 10, wherein the computer program, when run by the processor, causes the processor to perform:
- determining, according to the playback time information of the pronunciation of the polyphonic word to be rendered, a rendering duration of each syllable in the pronunciation of the polyphonic word;
- segmenting pixels of the polyphonic word to be rendered into the second number of sub-pixels equally in a second rendering direction;
- causing, according to the second rendering direction, the second number of sub-pixels obtained by segmentation to be in one-to-one correspondence with the syllables in the pronunciation of the polyphonic word to be rendered; and
- word-by-word rendering, for each syllable in the pronunciation of the polyphonic word to be rendered, the syllable and the sub-pixels of the second number of sub-pixels obtained by segmentation and corresponding to the syllable simultaneously within the rendering duration of the syllable.

12. The storage medium according to claim 9, wherein the computer program, when run by the processor, causes the processor to perform:
- acquiring the pronunciation of the polyphonic word to be rendered in the target lyrics from an additional part of a text of the target lyrics, and acquiring a rendering start identifier of each furigana in the pronunciation; and
- determining the rendering start identifier of each furigana in the pronunciation as the playback time information of the pronunciation.

13. A terminal comprising: a processor and a memory configured to store at least one instruction executable by the processor;
- wherein the at least one instruction, when executed by the processor, causes the processor to perform a method for rendering lyrics, the method comprising:
- acquiring pronunciation of a polyphonic word to be rendered in target lyrics, and acquiring playback time information of the pronunciation in the process of rendering the target lyrics, wherein the target lyrics are Japanese lyrics and the polyphonic word to be rendered comprises a word having multiple pronunciations, and the pronunciation of the polyphonic word to be rendered is adjacent to and parallel to the polyphonic word to be rendered;
- determining a first number of furiganas contained in the pronunciation, and determining whether a contracted sound exists in a furigana of the pronunciation of the polyphonic word to be rendered, wherein the contracted sound does not occupy syllables in the pronunciation of the polyphonic word to be rendered;
- word-by-word rendering, according to the first number and the playback time information of the pronunciation of the polyphonic word to be rendered, the polyphonic word to be rendered and each furigana in the pronunciation of the polyphonic word to be rendered simultaneously, based at least in part on determining that a contracted sound exists in a furigana of the pronunciation;
- wherein, when the contracted sound does not exist in the furigana of the pronunciation of the polyphonic word to be rendered, the method comprises:
- word-by-word rendering, according to the first number and the playback time information of the pronunciation of the polyphonic word to be rendered, the polyphonic word to be rendered and each furigana in the pronunciation of the polyphonic word to be rendered simultaneously, where the word-by-word rendering when the contracted sound does not exist in the furigana of the pronunciation comprises:
  - determining, according to the playback time information of the pronunciation of the polyphonic word to be rendered, a rendering duration of each furigana in the pronunciation of the polyphonic word to be rendered;
  - segmenting pixels of the polyphonic word to be rendered into the first number of sub-pixels equally in a first rendering direction;
  - causing, according to the first rendering direction, the first number of sub-pixels obtained by segmentation to be in one-to-one correspondence with the furiganas in the pronunciation of the polyphonic word to be rendered; and
  - word-by-word rendering, for each furigana in the pronunciation of the polyphonic word to be rendered, the furigana and the sub-pixels of the first number of sub-pixels obtained by segmentation and corresponding to the furigana simultaneously within the rendering duration of the furigana.

* * * * *